(12) United States Patent
Kalsi

(10) Patent No.: US 10,843,163 B2
(45) Date of Patent: Nov. 24, 2020

(54) EQUILIBRIUM APPROACH REACTOR

(71) Applicants: Energy Technologies Institute LLP, Loughborough (GB); Kamaldeep Kalsi, Cambridge (GB)

(72) Inventor: Kamaldeep Kalsi, Cambridge (GB)

(73) Assignee: KEW TECHNOLOGY LIMITED, Tamworth (GB)

( * ) Notice: Subject to any disclaimer, the term of this patent is extended or adjusted under 35 U.S.C. 154(b) by 0 days.

(21) Appl. No.: 15/345,329

(22) Filed: Nov. 7, 2016

(65) Prior Publication Data

US 2017/0348668 A1    Dec. 7, 2017

(30) Foreign Application Priority Data

Jun. 6, 2016    (GB) .................................. 1609849.3

(51) Int. Cl.
| | | |
|---|---|---|
| *B01J 19/24* | (2006.01) | |
| *B01J 4/00* | (2006.01) | |
| *B01J 19/02* | (2006.01) | |
| *B01J 19/00* | (2006.01) | |
| *C01B 3/02* | (2006.01) | |
| *C10K 1/00* | (2006.01) | |
| *C10K 1/02* | (2006.01) | |
| *C10K 3/00* | (2006.01) | |

(52) U.S. Cl.
CPC .......... *B01J 19/2405* (2013.01); *B01J 4/002* (2013.01); *B01J 19/0026* (2013.01); *B01J 19/02* (2013.01); *C01B 3/02* (2013.01); *C10K 1/002* (2013.01); *C10K 1/02* (2013.01); *C10K 3/001* (2013.01); *B01J 2208/00557* (2013.01); *B01J 2219/00087* (2013.01); *B01J 2219/00166* (2013.01); *B01J 2219/024* (2013.01); *B01J 2219/24* (2013.01)

(58) Field of Classification Search
CPC .... B01J 19/2405; B01J 4/002; B01J 19/0006; B01J 19/0026; B01J 2208/00557; B01J 2219/00087; B01J 2219/00166; B01J 2219/24; C01B 3/02; C10K 1/002; C10K 1/02; C10K 3/001
See application file for complete search history.

(56) References Cited

U.S. PATENT DOCUMENTS 2,160,456 A    11/1992    Lahm et al.
6,521,205 B1 *    2/2003    Beck .................... B01J 16/005
                                                        423/658.2

(Continued)

FOREIGN PATENT DOCUMENTS

| CN | 102234545 A | 11/2011 |
|---|---|---|
| GB | 2 407 818 A | 5/2005 |
| WO | 03/016250 A1 | 2/2003 |

OTHER PUBLICATIONS

Search Report issued in corresponding Great Britain application, dated Jul. 11, 2016.

*Primary Examiner* — Amber R Orlando
*Assistant Examiner* — Syed T Iqbal
(74) *Attorney, Agent, or Firm* — Hamre, Schumann, Mueller & Larson, P.C.

(57) ABSTRACT

An equilibrium approach reactor with the ability to receive a highly variable gas and normalise it to a useful quality, and further to utilise the energy from the gas itself to robustly elevate the operating temperature, to ensure good mixing and high conversion while having the ability to handle solids in multiple states.

16 Claims, 5 Drawing Sheets

(56) References Cited

U.S. PATENT DOCUMENTS

| | | |
|---|---|---|
| 6,767,375 B1 | 7/2004 | Pearson |
| 9,028,720 B1 | 5/2015 | Repasky |
| 2003/0072700 A1* | 4/2003 | Goebel .................... B01J 8/043 |
| | | 422/198 |
| 2015/0045456 A1 | 2/2015 | Schoedel et al. |
| 2015/0090938 A1* | 4/2015 | Meyer ..................... C10J 3/506 |
| | | 252/373 |

* cited by examiner

EQUILIBRIUM APPROACH REACTOR

TECHNICAL FIELD

The present invention relates to an equilibrium approach reactor, and further to a device for, and method of operation of, producing a stable, high quality energetic chemical gas product that can be utilised for power generation and chemical synthesis.

BACKGROUND

There is a drive towards re-cycling and fuel efficiencies in many technological and industrial areas. One such area is directed towards the recovery of energetic chemical vectors from waste products. Gases may be recovered from waste products by gasification. Such gases can be used in electricity generation, typically being used as a combustible fuel.

One such gas is termed synthesis gas or syngas. Gases containing hydrogen, carbon monoxide and carbon dioxide as primary constituents are typically termed syngas. Various industrial processes require syngas as a feedstock. These processes include chemical synthesis of products such as methanol, diesel, and ammonia, as well as power generation processes that utilise syngas as the primary energy. Interest in the latter applications is now becoming more widespread with the advent of biomass and waste-based fuelled gasification processes arising from a demand for better resource usage and as a driver for low carbon technologies.

Known processes typically produce gases with highly variable levels of permanent gases, such as hydrogen, and often contain contaminant components. These usually consist of a mixture of hydrocarbons with a wide range of molecular weights, and solids such as soot and ash based compounds.

In biomass and waste gasification processes, product gases are produced by apparatus termed gasifiers or pyrolysis units. Since the composition of waste can be highly variable, the gas composition produced from gasification is consequently highly variable. Gasification also produces, as unwanted side-products, a variable, and appreciable, level of soot and hydrocarbon contaminants.

A further contaminant arising from biomass and waste gasification is ammonia, which is difficult to remove using conventional acid based scrubbing techniques. Syngas comprising such contaminants, as well as the variability of said contaminants, can deleteriously effect equipment downstream that uses the syngas as fuel. It is these problems, at least in part, that impact in the commercial success of using such re-cycled fuel sources.

A known synthesis process is the Fischer-Tropsch process. This arrangement typically produces undesired components with a wide range of molecular weights, usually centred about the molecular weight of the desired product. The undesired products are generally disposed of by flaring or by further conversion using a subsequent process. This in turn produces further remnants that are typically flared, as they are too variable and contaminated to be of further use.

It would be advantageous to produce purer syngas more efficiently. Further, it would be advantageous to recover otherwise flared energetic gases.

The present invention has been devised to address the above problems.

SUMMARY OF THE INVENTION

Typically, syngas is prepared from low grade carbon based feed stocks such as Refuse Derived Fuel (RDF) and demolition grade biomass, as well as agricultural biomasses and zootechnic effluents.

The present invention relates to an equilibrium approach reactor for the processing of material obtained from gasification of carbonaceous material and chemical synthesis processes that utilise syngas as a chemical feedstock. The reactor converts an input gas, which may be highly variable in terms of composition, condensable at normal processing temperatures and loaded with solids in the fount of carbon or ash, into a processed syngas that is stabilised and useful as a chemical feedstock.

According to a first aspect of the present invention there is provided an equilibrium approach reactor for processing material obtained from the gasification of carbonaceous materials, comprising:
 a vessel;
 an inlet operable to allow process material to enter the vessel;
 an outlet operable to allow processed material to exit the vessel,
 wherein process material is retained within the vessel for a sufficient time to allow the process material to approach equilibrium.

The present arrangement mitigates problems with existing processes by subjecting input gases to process conditions that allow chemical equilibrium to be approached in a manner that is energy effective and is able to robustly manage the solid contaminants. Accordingly a stable, uncontaminated syngas is created for further use.

A syngas may be thus produced from low quality feedstocks to be utilised for many applications, including stable power generation, and allows otherwise wasted products from processes to be recovered and reused, improving process efficiency.

The function of the reactor is to provide an environment in which the raw incoming gas can be partially oxidised to elevate its temperature to 1050-1250° C. However, in preferred arrangements, the reactor is configured to operate at above 1100° C. Most preferably, the syngas is heated to 1150° C. In preferred arrangements, particularly when the process material contains feed stock ash, the operating temperature of the reactor is maintained below the fusion temperature of the feedstock ash.

Preferably the pressure in the vessel is kept at higher than atmospheric pressure. More preferably, the pressure is between 50 kPa(g) to 1200 kPa(g) (0.5 to 12 bar (g)). Pressure in the vessel may be achieved, at least in part, by inputting untreated syngas into the vessel at higher pressure. The syngas may be fed directly into the vessel at elevated pressure, by any conventional means.

The time that the syngas is held in the reactor is termed the dwell time or the residence time. In preferred arrangements the process material is retained within the reactor for at least 10 seconds, although more preferably the dwell time is at least 15 seconds. The reactor design, elevated temperature and pressurized raw syngas input all assist in enhanced resistance time. A longer than conventional dwell time allows for the material contained within the reactor to achieve chemical equilibrium.

Thus, in one arrangement, the syngas is then heated to approximately 1150° C. in a pressurised reactor by combusting a small fraction thereof. This has the consequence of providing a residence time of at least 10 seconds, which is sufficient time for the raw process material to react so as to approach equilibrium.

Allowing an approach to equilibrium has the effect of destroying all the organic contaminants and tar in the process material, as well as normalising the syngas composition. Thus, advantageously, the composition of the gas will be largely similar, regardless of the feedstock type. This is particularly advantageous for low-grade (and potentially highly variable) feed stocks.

Preferably the inlet comprises a heat exchanger, and more preferably a heat exchanger that is constructed from silicon carbide. This arrangement may be used to allow processed syngas, exiting from the reactor, to deliver heat to incoming raw syngas. Therefore, the unprocessed syngas is pre-heated. In preferred arrangements the unprocessed syngas is heated to approximately 700° C. to 900° C. prior to entering the chamber. Using a heat exchanger to pre-heat the raw syngas requires less syngas to be ignited by the oxygen injection system.

Additionally, the equilibrium approach reactor may comprise an oxygen injection system operable to inject oxygen into the vessel. The oxygen reacts with a portion of the syngas, which elevates the temperature inside the vessel.

In preferred arrangements, the oxygen injection system comprises a plurality of nozzles. In event more preferred arrangements, the system comprises at least three nozzles. The nozzles may be located on the reactor so that they are disposed on a helical path.

By providing an input syngas stream at high pressure, and using an oxygen injection system to raise the temperature inside the vessel, the pressure inside the vessel can be maintained at a level higher than atmospheric pressure. By controlling the input pressure, and/or the level of oxygen injected, the pressure can be controlled.

It is preferred that the syngas and the oxygen are injected into the reactor so as to promote turbulence within the reactor.

Maintaining the vessel at a higher pressure increases the residence time (also termed dwell time) of the material in the vessel. The arrangement could function at atmospheric pressure or sub-atmospheric pressure, but the vessel would need to be relatively larger than the pressurised vessel for the same dwell time. However, it should be appreciated that this arrangement is also contemplated as being within the scope of this document.

According to a second aspect of the present invention, there is provided an equilibrium approach reactor system, comprising: a vessel operable to process syngas; means to introduce pressurised unprocessed syngas into the vessel; and an oxygen injection system operable to inject oxygen into the vessel so as to cause auto-ignition of a proportion of the syngas so as to raise the temperature in the vessel, such that the syngas is maintained in the vessel for a dwell time sufficient for said syngas to reach chemical equilibrium.

A combination of pressure and temperature is used inside the vessel to ensure a desired residence time for the syngas. In preferred embodiments this is at least 10 seconds, and in more preferred embodiments is at least 15 seconds.

It is preferred that oxygen is input into the vessel to react with the syngas therein to cause the temperature within the vessel to be raised to at least 1100° C., with 1150° C. being more preferred.

In particularly preferred arrangements steam and oxygen are input in combination.

Preferably, the system comprises a heat exchanger, and more particularly, a parallel flow heat exchanger. In preferred embodiments, processed syngas and raw syngas are concurrently, but independently and separately, passed through the heat exchanger so that the processed syngas is used to heat the raw syngas. A further advantage of this arrangement is that the processed syngas is cooled by the raw syngas.

It is further preferred that the system comprises means to inject steam into the vessel. This may be achieved using the oxygen injection system.

Preferably, the oxygen injection system comprises a ceramic lance or tube. Alternatively, the lance or tube may comprise a nozzle constructed from a heat-resistant alloy.

In preferred arrangements, the oxygen injection system comprises a plurality of injection points. It is more preferred that the system comprises at least three injection points.

In preferred arrangements, the equilibrium approach reactor system comprises means operable to inject one or both of an abrasive media and a sorbent media into the vessel. This means may separate or combined, and may be further combined with the oxygen injection system.

It is preferred that the system comprises a discharge system. In preferred arrangements, this system is located at the base of the vessel. The discharge system may comprise a sand bath operable to receive solids. The system may utilize progressive removal using a cooled discharge screw.

According to a third aspect of the present invention, there is provided a method of operating an equilibrium approach reactor, comprising the steps of providing a vessel operable to contain process material; introducing process material into said vessel; and maintaining the process material in said vessel until said process material substantially approaches equilibrium.

It is preferred that the equilibrium approach reactor may be operated in a plurality of modes. It is preferred that one mode aids removal/processing of solids in a substantially dry state, and the second mode removes solids that are in a substantially molten state.

According to a fourth aspect of the present invention, there is provided a reactor comprising a vessel with a primary axis, said reactor further comprising at least one process gas input point operable to allow process gas to be input into the reactor and at least three oxygen injection nozzles to allow oxygen to be injected into the vessel, wherein the input point and the injection nozzles are arranged around the vessel with respect to the primary axis. It is preferred that the nozzles are arranged along a helical path.

Preferably, the process gas input point is at substantially a first end of the vessel, with the oxygen injection nozzles spaced along a helical path towards a second end of the vessel.

In preferred arrangements, the process gas and the oxygen are operable to be input into the vessel to promote a turbulent flow. The process gas and oxygen react together, causing partial oxidation of the process gas. This has the effect of raising the temperature within the vessel. The increased temperature and the turbulent flow aid in maintaining the process gas within the vessel for an enhanced time. Furthermore, the helical arrangement of the nozzles is disposed such that it promotes radiative heating of the bulk gas.

Preferably, the process gas and oxygen are maintained within the vessel for such time that they approach chemical equilibrium.

Preferably, the oxygen injection nozzles comprise means to allow the simultaneous injection of further media. For example, steam may be injected in the vessel. Additionally or alternatively solid media may be directed into the vessel. These may include sorbent or abrasive media or chemical catalysts.

The features disclosed in relation to the fourth aspect are designed to be complementary with the first and second aspects, and should therefore be considered as preferable features thereto.

According to a fifth aspect of the present invention there is provided a reactor comprising a first chamber and a second chamber, and an interface between said first and second chambers, and means to inject multiple fluids into the first chamber so as to cause said fluids to mix and react and form a turbulent flow, wherein said interface is operable to disengage the turbulent flow by allowing rapid expansion into the second chamber.

This arrangement is particularly advantageous for processing solids contained within the syngas. Disengaging the turbulent flow at an interface causes the syngas to rapidly expand, reducing the velocity of the gas. This causes solids to disengage from the syngas and drop to the bottom of the second chamber.

Preferably, the multiple fluids comprise syngas and oxygen, and a reaction there-between causes partial oxidation of the syngas, leading to an elevated temperature within the first chamber.

Preferably, the interface comprises a region of reduced cross-sectional area with respect to the first and second chambers. In typical arrangements, the interface may be considered as a reduction neck between the first and second chambers.

Preferably, the second chamber comprises a syngas outlet. In preferred arrangements, the syngas outlet is angled, when the reactor is in use, upwards with respect to the first and second chambers.

It is preferred that the reactor further comprises a third chamber operable to receive solid contaminants. Solids that have been separated from the syngas typically fall to the bottom of the second chamber. By providing a further chamber, the solids may be collected. The third chamber may be part of a discharge system operable to remove solid contaminants.

The third chamber may comprise a steam injection point. This arrangement is particularly advantageous, in that it allows reaction between carbon containing solids in the third chamber to be reacted with steam to produce hydrogen, carbon monoxide and carbon dioxide.

It will be appreciated that features in the various described aspects may be combined with one another. For example, the features of the first, second, fourth and fifth aspects may be combined, and may collectively or individually be used in conjunction with the third method aspect.

Accordingly, an aspect of the present invention comprises an equilibrium approach reactor comprising a vessel with first and second chambers connected by an interface, a syngas input point operable to inject syngas into the first chamber and a syngas output point operable to allow processed syngas to exit the second chamber, said first chamber comprising three oxygen injection nozzles that, together with the syngas input point, define a spiral path around the first chamber, wherein, in use, the pressure and temperature in at least the first chamber is such that syngas contained therein is maintained for sufficient time for it to approach chemical equilibrium.

In order that the present invention be more readily understood, specific embodiments thereof will now be described with reference to the accompanying drawing.

DESCRIPTION OF THE DRAWINGS

FIG. 1b shows a front view of the equilibrium reactor of FIG. 1a.

FIG. 3b shows a close-up of an in-duct injection point of the SBF system of FIG. 3a.

COMMENT ON DRAWINGS

It should be appreciated that the drawings show individual aspects of an equilibrium approach reactor in accordance with the present invention for ease of understanding. Features shown in one drawing may be present in arrangements shown in another drawing.

Specific Embodiments

An embodiment of the present arrangement comprises an equilibrium approach reactor (hereinafter referred to as "the reactor") that resolves issues inherent with existing processes by subjecting input material to process conditions that cause the input material to tend to chemical equilibrium. The present arrangement is particularly advantageous in that this is achieved in a manner that is energy effective, and that is able to robustly manage solid contaminants in the input material. The reactor produces a stable, uncontaminated syngas for further use. The reactor therefore enables syngas from poor feedstocks to be utilised for stable power generation and allows otherwise wasted products from processes to be recovered and reused, improving process efficiency.

Industrial processes generally require input material as a feedstock. Gases containing hydrogen, carbon monoxide and carbon dioxide as the primary constituents may be termed syngas. Syngas to be introduced into the reactor may be termed raw syngas, or unprocessed syngas. Syngas that has been through the reactor may be termed processed or treated syngas.

Conventional reactors operable to convert methane or other hydrocarbons to syngas cannot process solids in variable states. Attempts to do so invariably result in the solids inciting. As a consequence, this may lead to fouling, blockage and/or equipment failure (and hence reactor downtime). Additionally, prevalent processes lead to high levels of soot formation as the residence time of the syngas in the reactor is too short. To address the short-comings in known arrangements, the present arrangement increases the temperature of the syngas and holds it at an elevated temperature for a given time span in a controlled manner. The system comprises: a vessel to provide the residence time and temperature combination required to obtain cracking of hydrocarbons and shedding of solid contaminants (and particularly fly ash); a means to supply oxygen to the vessel to initiate oxidation in a controlled manner; and a means of removing deposited particulate matter from the vessel. These elements are considered below.

Figure 1A:
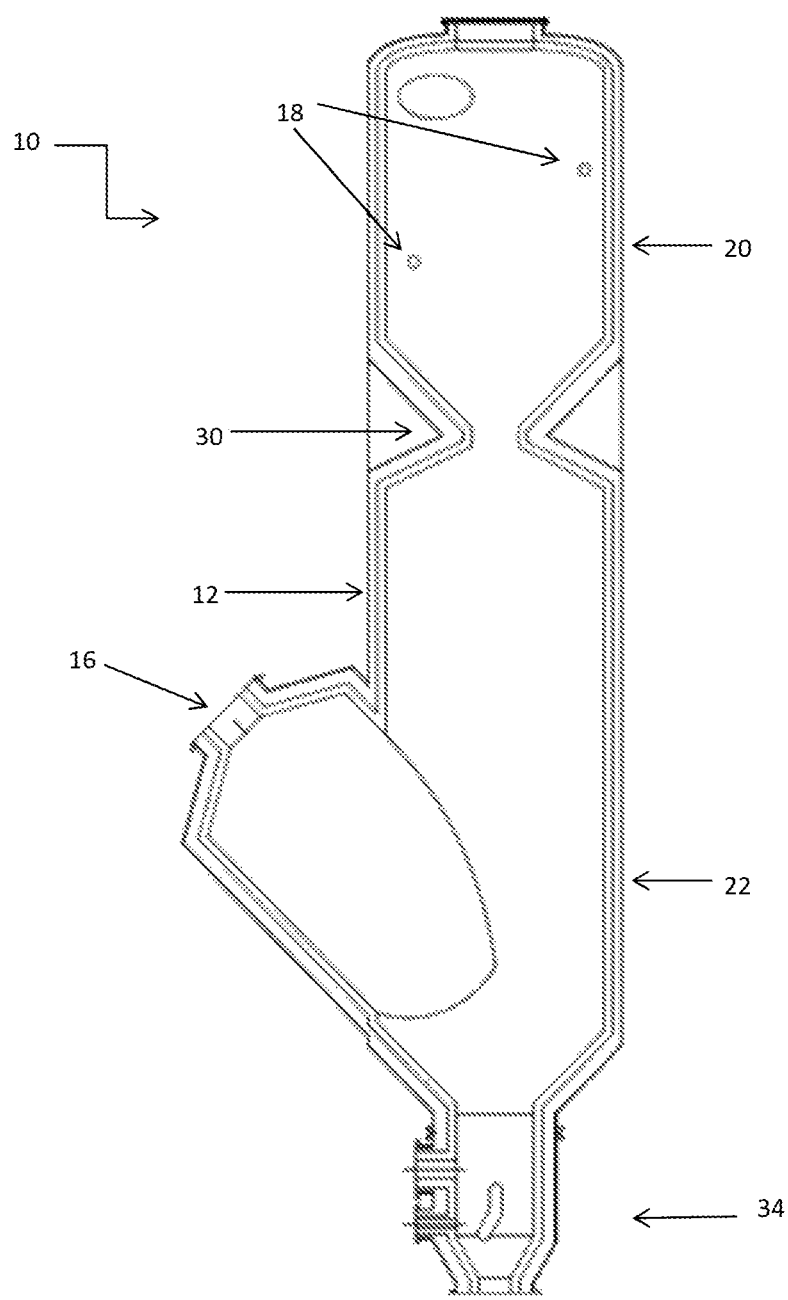
FIG. 1a shows a side view of an equilibrium reactor according to an embodiment.
Figure 1B:
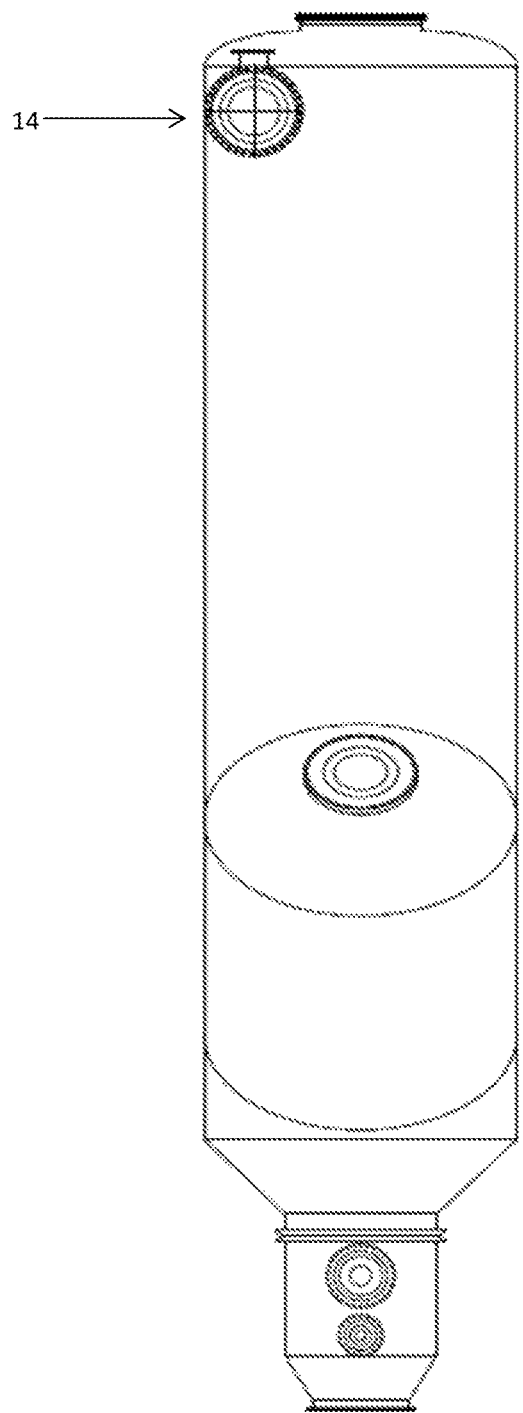

With reference to FIGS. 1a and 1b, in one embodiment the reactor 10 comprises a chamber 12 consisting of a refractory lined vessel. The chamber 12 may be cylindrical, but any appropriate dimensions will suffice. The refractory lining may comprise an alumina based lining with high silicon carbide content. This provides resistance to alkali penetration, spalling and thermal shock.

For a system optimised to produce consistent syngas, an operating temperature in the chamber 12 that is too low will not reform hydrocarbons satisfactorily, while a temperature that is too high will result in a large energy penalty and a loss in overall efficiency. Accordingly, it is preferred that the reactor is run at around 1100° C. to 1200° C., and more preferably at 1150° C.

There is further provided a syngas input point 14 to allow the input of raw syngas into the chamber 12. The arrangement further comprises a syngas output point 16 to allow the egress of treated syngas from the chamber 12. The syngas output point is typically angled upwards with respect to the chamber 12. It is preferred that the syngas in the chamber 12 is processed at an elevated pressure. This will typically be at between 50 kPa and 1200 kPa. However, depending on reactor and/or system specifics, other pressures may be used. To assist, the syngas may be input into the chamber 12 at high pressure.

The chamber 12 may comprise an upper section 20 and a lower section 22. The syngas input point 14 is located at the upper section 18, whilst the syngas output point 16 is located in the lower section 22 of the chamber 12.

The upper section 20 may be considered as a first chamber, with the lower section 22 being considered as a second chamber.

The upper section 18 may be termed the partial oxidation zone (hereinafter referred to as POX). Syngas is input into the upper section of chamber 12 tangentially. Due to high velocity input of the unprocessed syngas, and the dimensions of the chamber 12, the POX comprises a highly swirling turbulent flow. Oxygen may be injected into the chamber 12 so as to promote turbulence and swirl. Such an arrangement enhances the mixing and residence time of the untreated syngas. Details regarding oxygen injection are given below.

The upper and lower sections 20, 22 may be connected by an interface, such as a reduction neck 30. The reduction neck 30 has the function of promoting mixing and subsequently reducing the gas velocity (by breaking up the swirling motion) such that solids may drop out of the flow to a discharge system 34.

Figure 2:
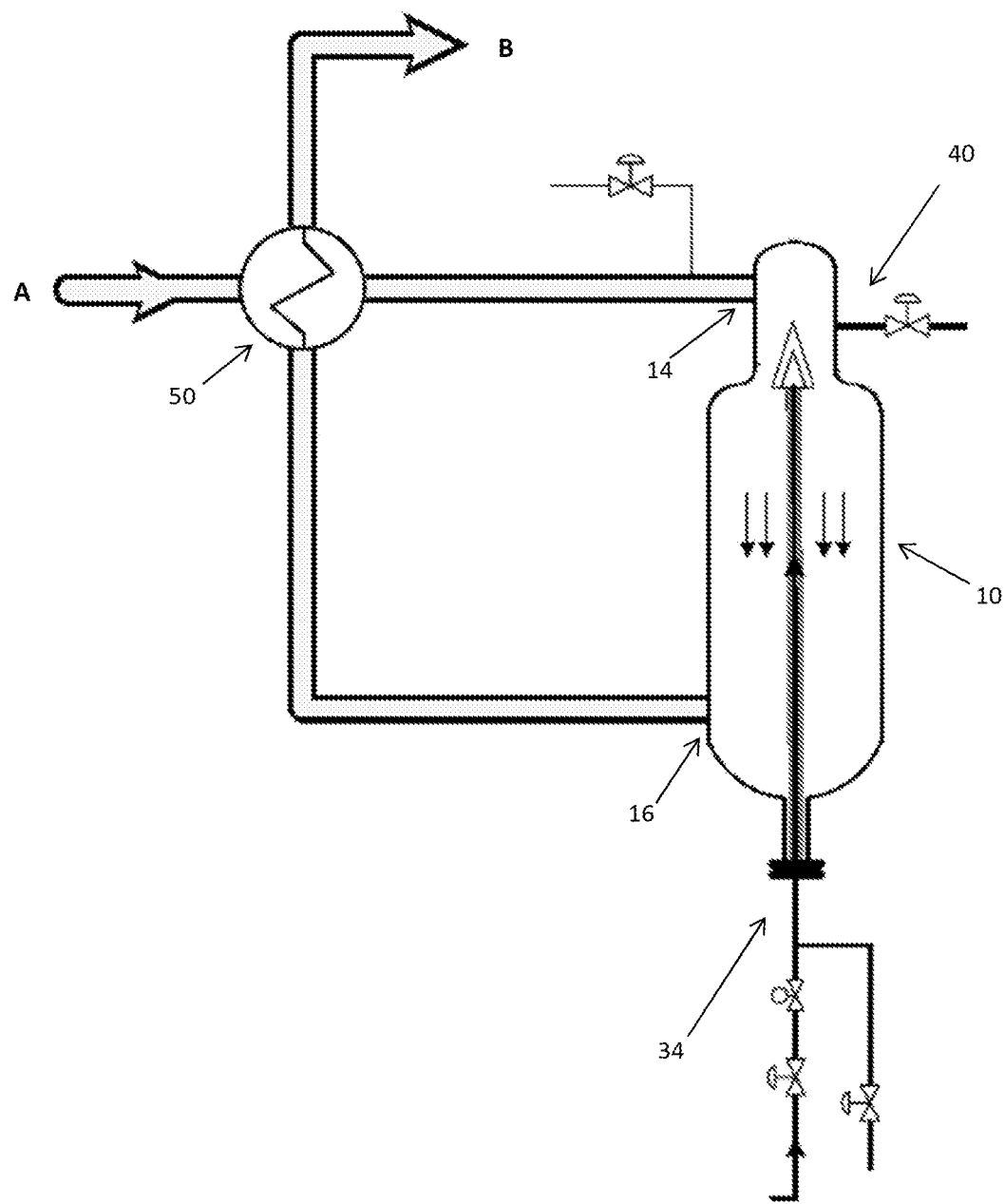
FIG. 2 shows an example a reactor, the input and output feeds, and an example heat exchanger.

The arrangement may also comprise a system 40 to introduce oxygen into the chamber 12 to cause the auto-ignition of a small quantity of syngas. This reaction has the effect of raising the temperature in the chamber 12. The desired temperature can be achieved, at least in part, by controlling the flow of oxygen into the chamber 12. FIG. 2 shows an example of a reactor 10 comprising such a system.

Thus, in an embodiment, input points 18 for cooperation with an oxygen injection system 40 for the injection of oxygen or an oxygen/steam mixture to allow a gradual temperature increase are provided in the reactor 10.

The oxygen injection system 40 may comprise one or more injection nozzles 42 consisting of a multi-annular arrangement manufactured from a carbide-based material. The nozzles 42 are constructed such that a diffusion flame resulting from the oxidant injection is offset from the nozzle face.

It is particularly preferred that the oxygen injection system exposes at least three nozzles. By providing the syngas input point 14, and the plurality of oxygen injection nozzles 42 on a helical or spiral path around the upper section 20 (first chamber), turbulence and swirl are promoted in the POX.

Figure 4:
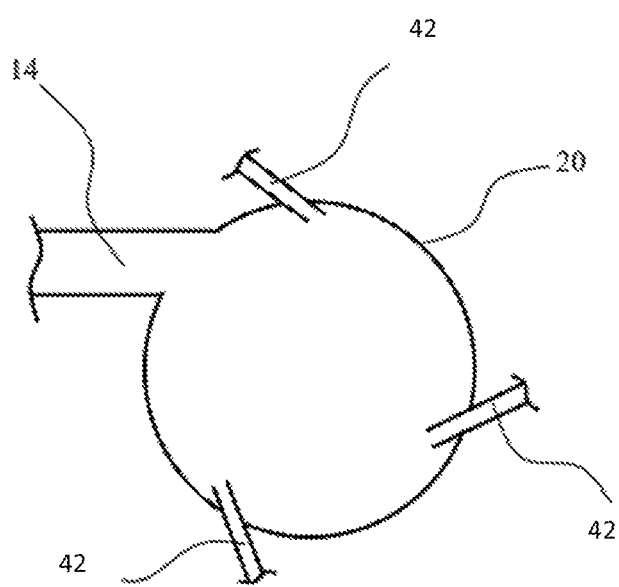
FIG. 4 shows a top view cross-section of a reactor according to an embodiment.

FIG. 4 shows a top view of a reactor showing example positions of the syngas input point 14, and the plurality of oxygen injection nozzles 42. When the reactor is in situ, the syngas input point 14 would be substantially at the top of the first chamber and the plurality of oxygen injection nozzles (as taken clockwise starting from the syngas input point 14) are progressively lower so that a helical path is defined by the syngas input point 14 and the plurality of oxygen injection nozzles.

In use, the oxygen injection nozzles 42 will operate at high temperatures. If solids, such as ash, are present in the inputted raw syngas, conventional injection nozzles may be subject to fouling when the ash melts on contact with the hot nozzle tip. The nozzle permits concurrent steam injection together with the oxygen or through a surrounding annular jacket. This arrangement mitigates nozzle fouling and further advantageously results in better overall conversion of input waste material to treated syngas. The nozzle also permits utilisation with a pre-heated oxidant so as to allow flameless oxidation which improves the effectiveness of the process.

The oxygen injection nozzles 42 may each comprise a ceramic coated lance. Each nozzle 42 may be cooled with nitrogen or steam to allow extended service life. Each nozzle 42 may comprise a surrounding shroud. In a preferred arrangement the lance consists of a ceramic-coated tube that terminates in a replaceable nozzle section. The nozzle is constructed from a carbide-based ceramic or a heat resistant alloy and is removable from the lance for maintenance purposes.

The entire oxygen supply assembly 40 may be de-coupled from the reactor 10. This permits easier access for maintenance.

A number of firing ports may be drilled into each nozzle in an engineering pattern through which, in use, the oxygen flows.

A desired temperature profile for the reactor 10 may be calculated in advance. The oxygen flow rate into the chamber 12 is controlled by a control valve that meters a flow to achieve the temperature profile in the reactor 10 that provides a desired combination of temperature and dwell time for high conversion of contaminants (such as naphthalene, benzene and soot) through the Boudouard reaction.

The geometry of each nozzle 42 is configured to allow sufficient oxygen exit velocity and surface protection, without allowing excessive flame lift-off. Some flame lift-off may be desired, as it improves the life of the nozzle tip. A flame arrestor may be provided. Explosion protection may also be provided in the oxygen supply line to the oxygen injection system 40.

The temperature around the nozzle is measured using a thermocouple. The thermocouple may be embedded in the nozzle. However, the thermocouple may be located in any position proximate to the nozzle. The thermocouple is operable, at least in part, to control a coolant media (such as nitrogen or steam) flow rate.

A flame resultant from oxygen injection is a diffusion flame, and hence the requirement for high turbulence in the upper section of the chamber 12 to ensure rapid mixing. The oxygen flow rate into the chamber 12 under normal operation is preferably 0.1-0.2 kg/s. The temperature in the immediate region after a nozzle 42 (sometimes referred to as the flame temperature) may exceed 3000° C.

The syngas in the zones near the oxygen injection nozzles 42 experiences high temperatures due to the combustion of hydrogen with oxygen. The hot gas in these zones quickly mixes with cooler gas, raising the bulk temperature of the flow. Ash present in these local zones will melt, and therefore has a high slagging probability. This deleteriously affects reactor 10 efficiency, and hence mitigation of slagging at nozzle tips is advantageous. The following preferred features individually and collectively aid performance of the oxygen injection system 40.

The reactor 10 comprises a plurality of oxygen injection points 18. The injection points receive a nozzle from the oxygen injection system 40. Typically there are three points, although any number may be provided. It is desirable to provide the nozzles along a helical path on the upper chamber 20. Multiple injection points ensures that the oxygen addition, and therefore the temperature increase, is progressive and does not result in zones where the local temperature is several hundred degrees above the fusion temperature of ash. Accordingly, the total amount of ash that is actually melted in absolute terms is limited. Temperature consistency in the chamber 12 is also assisted by using steam injection together with oxygen to reduce the temperature rise.

The addition of steam together with oxygen allows the velocity of the injected jet to be maintained at a high rate. Since the combustion of syngas with oxygen in the reactor occurs as a diffusion flame, the high velocities ensure that the flame is always 'lifted off' from the nozzle 42. Injecting steam into the chamber 12 about the nozzles ensure that the temperature near the nozzle surfaces is several hundred degrees lower than the bulk temperature. Steam injection is modulated to ensure that 'lift off' is consistently achieved.

In line with the 'lift off' effect, whereby the hot flame zone is kept away from the nozzle surfaces, the oxygen injection nozzles 42 are configured to avoid recirculation zones. This is done to ensure that locally melted slag does not accumulate in these zones and cause deposit build up.

Each nozzle 42 may be retractably mounted on the reactor 10. Accordingly, during maintenance stoppages, each nozzle 42 can be serviced more rapidly, and in a more robust manner.

FIG. 2 shows the reactor 10, with the syngas inlet 14 and syngas outlet 16 (the interface 30 between the upper and lower sections 20, 22 is not shown). A heat exchanger 50 is further provider. The heat exchanger is operable to receive syngas from a source A and pass it on to the reactor 10. Additionally, the heat exchanger 50 is also operable to receive processed syngas from the chamber 12, and pass it on to a destination B. This arrangement is advantageous in that it allows raw syngas to be pre-heated by the exiting syngas, and, as a corollary, allows the processed syngas to be cooled by the incoming syngas.

An important aspect of syngas processing is managing solids, such and soot and ash, within the reactor 10. The level of solids in the raw syngas may not be known. Accordingly, it is desirable to provide an arrangement that can process input material with varying levels of solids.

The ability to cope with solids in high temperature chambers is well-known in arrangements designed for the combustion of an ash-laden syngas stream, such as those utilised for the combustion of syngas generated from waste for numerous waste-to-energy technologies. Another arrangement that requires management of solids is coal gasification. These arrangements rely on the temperature being high enough for the ash to be in a completely liquid slag state such that it can be removed from the chamber. Additives such as coal and silica sand are typically added to modify the flow behaviour of the slag. If sufficient energy is not available, natural gas may be supplemented to increase the temperature.

In the present arrangement, raw syngas entering the chamber 12 will typically contain solids, such as soot and ash, if the syngas is derived from a fuel source using a gasification process. Depending on the fuel source used, solids may be unmelted, partially melted or fully liquid with variable viscosities. Known methods of processing solids are not appropriate to the present arrangement.

Solids may causes blockages with the reactor 10, or within apparatus within a system containing the reactor 10. Accordingly, it is important to ensure an unblocked flow path for the input gas through the reactor 10. The arrangement of the reactor allows for a free flow path. Additionally, the reactor may be operated in a plurality of modes (typically termed 'dry mode' and 'wet mode'; described in detail below) so that solids, regardless of their melting point, can be removed either as a pass through with the gas, or using a discharge system 34. The discharge system 34 is described further below, and particularly in relation to FIGS. 3a and 3b.

The present embodiment is operable to manage solid content irrespective of composition and physical state (solid, partially melted/softened liquid solid mixture, completely incited liquid). As shown in FIGS. 1a and 1b, the reactor 10 is shaped to effectively pass solids in all states possible within the temperature operating range required for equilibrium approach for the bulk gas mixture.

The shape of the reactor aids the removal of solid contaminants from the syngas. Specifically, the reactor 10 comprises first chamber 20 and second chamber 22, and an interface 30 there-between. Means to inject multiple fluids into the first chamber so as to cause said fluids to mix and react and form a turbulent flow is further provided. The interface 30 is operable to disengage the turbulent flow by allowing rapid expansion into the second chamber 22.

The interface 30 may comprise a reduction neck 30. This is typically a section with reduced cross-sectional area with respect to the first and second chambers 20, 22.

The first chamber 20 comprises the POX. The syngas is processed at high temperature, and is at high velocity. Fluid velocity in the first chamber 20 is typically 6 ms$^{-1}$. At this point solid contaminants are typically suspended within the high velocity syngas. When the syngas reaches the reduction neck 30, the turbulent flow is interrupted, and, due to rapid expansion into the second chamber 22, slows considerably to below 0.4 ms$^{-1}$. This action causes the solids to drop from the syngas to be collected into a discharge system 34 at the base of the second chamber 22.

Or, put another way, the process gas travels through the interface 30 where the turbulent flow is disengaged. This mechanism allows for the dis-association of the syngas and any contained solid contaminants.

The management of an entire solid load that is either 1) a completely unmelted solid ash that has low fouling propensity (is not 'sticky') or 2) a completely melted ash that flows as a slag along the walls of the reactor to a discharge system is relatively controllable. However, in most processes the solids will comprise a portion of both states. Typical processes are operated at a temperature such that solids may not have the rheology to flow along the walls of the reactor 10, but be sufficiently viscous to stick thereto.

A sorbent media may be added to the syngas prior to introduction to the reactor 10. This sorbent media has a higher melting point than ash and so increases the bulk melting properties of the ash. The sorbent media prevents solid hold-up in the reactor 10. Further details of this arrangement are set out below.

The reactor 10 may further comprise a secondary bed feed injection system 22 and a temperature control system (not shown). Secondary bed feed is typically an abrasive media that is fed into the chamber 12. This abrasive media may be introduced into the chamber via an input location in the entry duct to the reactor or through the oxygen injection lance 42 with a carrier media such as steam.

The secondary bed feed (sometimes referred to as SBF) also acts as a sorbent with high surface area onto which condensation or melting fractions can nucleate and deposit, preventing the ash from depositing on interior surfaces of the chamber 12. Typically, the surface area available from the SBF is 2000-4000% higher than the internal process surfaces, making the probability of deposition on the SBF much higher than that of depositing on the surface instead.

The SBF media may be an ash modifier or a catalyst that serves to enhance reactions within the chamber 12, and/or suppress fouling.

Figure 3A:
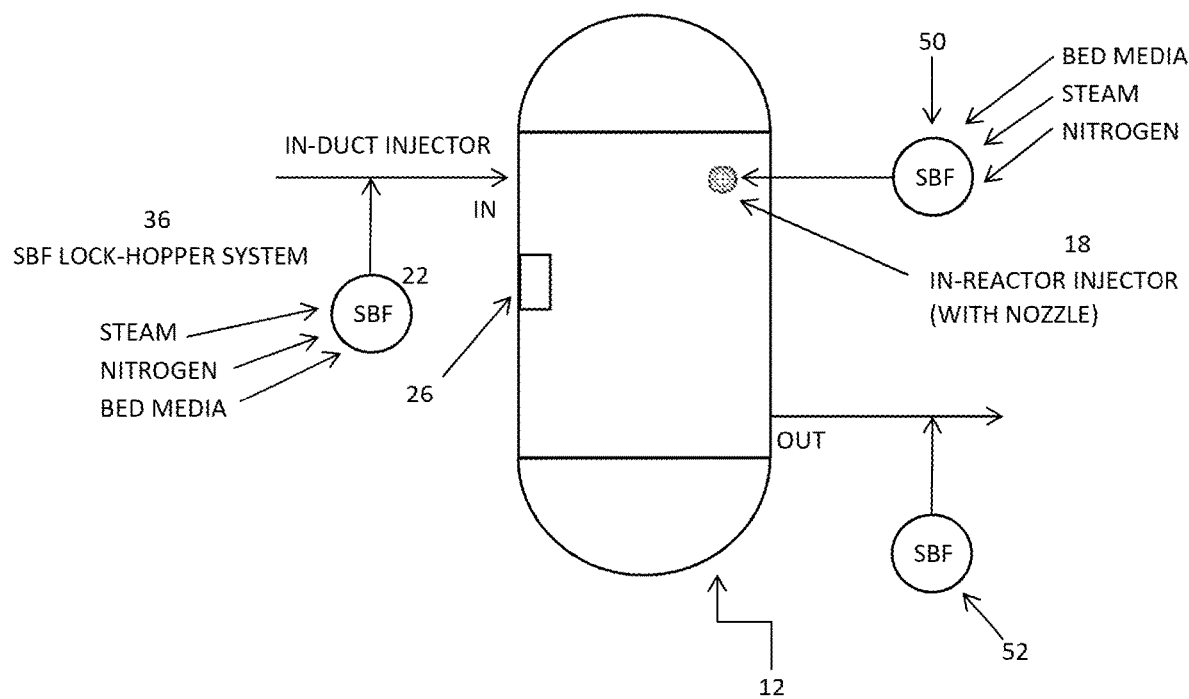
FIG. 3a shows an example of an equilibrium approach reactor with specific reference to a secondary bed feed system.

With reference to FIG. 3a, the reactor 10 comprises a duct or inlet for introducing secondary bed feed media, and a second duct, or outlet for the egress of secondary bed media and collected solids. The secondary bed feed system 22 comprises a lock-hopper 36 into which may be input a steam feed, a nitrogen feed and a secondary bed media feed. Each of the feeds is passed to the inlet duct engaged with the reactor 10.

The duct or inlet for introducing secondary bed feed media may be one or more of the syngas input point 14, and the plurality of oxygen injection nozzles 42. However, a dedicated input is also contemplated.

A further secondary bed media feed 50 may be provided.

A third SBF system 52 may be provided on the outlet duct.

The SBF injection points may be positioned to mitigate fouling propensity.

Figure 3B:
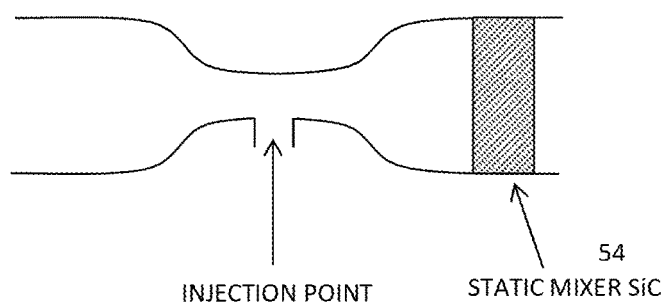

FIG. 3b shows an enlarged schematic of the inlet duct. The duct may comprise a static mixer 54 prior to the secondary bed media being introduced to the reactor 10. The static mixer 54 is typically manufactured from silicon carbide. The mixer is operable to enhance mixing of the media to be introduced into the reactor 10.

The reactor 10 is capable of operation in two modes. The first is a dry mode, whereby the solids are unmelted or part-melted, and the second is a wet mode, when the solids are a fully flowing slag. The secondary bed feed 22 may function with the reactor 10 in either dry in normal operation or in a wet cycling mode.

In dry mode, an abrasive media typically consisting of an alumina based media may be injected into the flow. The optimum temperature range for tar cracking is 1050° C.-1100° C. This correlates with the desired operating parameters of the reactor 10, and hence the solids will usually predominantly be in an unmelted state. As such, the reactor 10 will typically function in dry mode.

The reactor discharge system 34 consists of a sand bath operable to receive removed solids from the reactor 10, and progressively removes them using a cooled discharge screw. The sand bath is maintained with a small fluidisation flow for temperature control and to ensure that any solid or slag received is agglomerated and carried away. The rate of the fluidisation flow may be changed to modify the agglomerate dimensions.

In preferred arrangements, steam may be injected into the reactor discharge system 34. The solids collected in the reactor discharge system 34 are typically carbon rich, and react with the steam to produce hydrogen, carbon monoxide and carbon dioxide.

A further advantage of injecting SBF is internal cleaning of, at least, the first chamber 20. The flow velocity in the first chamber 20 is typically greater than 6 ms$^{-1}$. Accordingly, the SBF media (sorbent media) acts as an abrasive media, preventing solid build up by eroding deposits. The process may be considered analogous to a sand-blasting process. Further, any deposits that are formed are more friable as a consequence of the SBF media being present in the structure.

Wet cycling approach is designed to temporarily increase the operating temperature of the reactor 10 to above 1250° C. to allow the deposited slag to melt and flow into the reactor bottom. It is expected that this will be required once every 3000 hours interval, and will run for approximately six hours, depending on the quantity and characteristics of the ash product.

The wet cycling requires an increased oxygen demand that combusts more syngas to achieve the higher output. The process may be economised through the supplementation with an auxiliary fuel such as natural gas, injected into the POX chamber. The reactor quench is operated in this mode with the downstream SBF to control the ingress of fly slag into the chamber 12. The slag drains into the sand bath and is then extracted from the reactor.

A water cooled process camera 26 may be mounted in the reactor 10 to enable visualisation of deposit formation in critical zones.

It will be appreciated that the present invention is not to be limited by the above embodiments, and that many variations are within the scope of the appended claims.

It will be further appreciated that the present arrangement provides a reactor with the ability to receive a highly variable gas and normalise it to a useful quality, and in preferred arrangements, to utilise the energy from the gas itself to robustly elevate the operating temperature, to ensure good mixing and high conversion while having the ability to handle solids in multiple states.

It will be further appreciated that there is provided a reactor 10 operable to heat syngas to approximately 1200° C. and hold it at this temperature for a given residence time. This combination cracks the tars in the syngas with a high efficiency. The temperature is achieved via the injection of oxygen that causes local auto-ignition of a proportion of the gas.

The reactor 10 is also designed to remove fly ash from the syngas. The fluid mechanic design of the chamber 12 forces a high contact time between the material flow and the walls of the chamber. This arrangement allows the fly ash to stick to the chamber 12. The system periodically discharges the fly ash in a controlled manner.

The invention claimed is:

1. An equilibrium approach reactor for processing syngas with varying levels of solids from the gasification of carbonaceous materials and configured to operate at above 1100° C., the reactor comprising:
    a vessel having a first chamber, a second chamber, and a third chamber, the first and second chambers connected by an interface with a reduced cross-sectional area with respect to the first and second chambers, wherein
    the first chamber includes:
        an inlet operable to allow process material to enter the vessel, and
        at least three oxygen injection nozzles to allow oxygen to be injected into the first chamber, wherein the inlet and the injection nozzles are arranged helically around the vessel with respect to an axis passing through each of the first, second and third chambers,
    the second chamber includes an outlet operable to allow processed material to exit the vessel, and the third chamber is configured to receive solid contaminants that have fallen to a bottom of the second chamber, and the third chamber includes a steam injection point.

2. The equilibrium approach reactor according to claim 1, wherein the process material contains ash, and the operating temperature is maintained below the fusion temperature of the ash.

3. The equilibrium approach reactor according to claim 1, wherein a pressure in the vessel is kept at higher than atmospheric pressure.

4. The equilibrium approach reactor according to claim 1, wherein a pressure in the vessel is kept at between 0.5 and 12 bar (g).

5. The equilibrium approach reactor according to claim 1, wherein the inlet comprises a heat exchanger.

6. The equilibrium approach reactor according to claim 5, wherein the heat exchanger is constructed from silicon carbide.

7. The equilibrium approach reactor according to claim 1, further comprising an oxygen injection system operable to inject oxygen into the vessel.

8. The equilibrium approach reactor according to claim 7, wherein the oxygen injection system is operable to inject oxygen into the vessel so as to cause auto-ignition of a proportion of the syngas so as to raise the temperature in the vessel, such that the syngas is maintained in the vessel for a dwell time of at least 10 seconds to allow said syngas to approach chemical equilibrium.

9. The equilibrium approach reactor according to claim 1, wherein the outlet is angled upwards with respect to the second chamber.

10. The equilibrium approach reactor according to claim 1, wherein the oxygen injection nozzles comprise means to allow the simultaneous injection of further media.

11. A method of operating the equilibrium approach reactor according to claim 1, comprising the steps of
   a. introducing the process material into the first chamber through the inlet; and
   b. maintaining the process material in said vessel for the at least 10 seconds such that said process material substantially approaches equilibrium.

12. The method of claim 11, wherein the reactor is operated at above atmospheric pressure.

13. The method according to claim 11, wherein the reactor comprises a plurality of operating modes.

14. The equilibrium approach reactor according to claim 1, wherein the inlet is at substantially a first end of the first chamber, with the oxygen injection nozzles spaced along a helical path towards a second end of the first chamber.

15. The equilibrium approach reactor according to claim 1, wherein the process material and the oxygen are operable to be input into the vessel to promote a turbulent flow.

16. An equilibrium approach reactor for processing syngas with varying levels of solids from the gasification of carbonaceous materials and configured to operate at above 1100° C., the reactor comprising:
   a vessel having a first chamber and a second chamber, the first and second chambers connected by an interface with a reduced cross-sectional area with respect to the first and second chambers, wherein:
      the first chamber has an inlet operable to allow process material to enter the vessel, and
      the second chamber has an outlet operable to allow processed material to exit the vessel;
   an oxygen injection system operable to inject oxygen into the vessel, wherein the oxygen injection system is operable to inject oxygen into the vessel so as to cause auto-ignition of a proportion of the syngas so as to raise the temperature in the vessel, such that the syngas is maintained in the vessel for a dwell time of at least 10 seconds to allow said syngas to approach chemical equilibrium; and
   at least three oxygen injection nozzles to allow oxygen to be injected into the vessel, wherein the inlet and the injection nozzles are arranged helically around the vessel with respect to a primary axis,
   wherein the oxygen injection nozzles comprise means to allow the simultaneous injection of further media.

* * * * *